Figure 1:
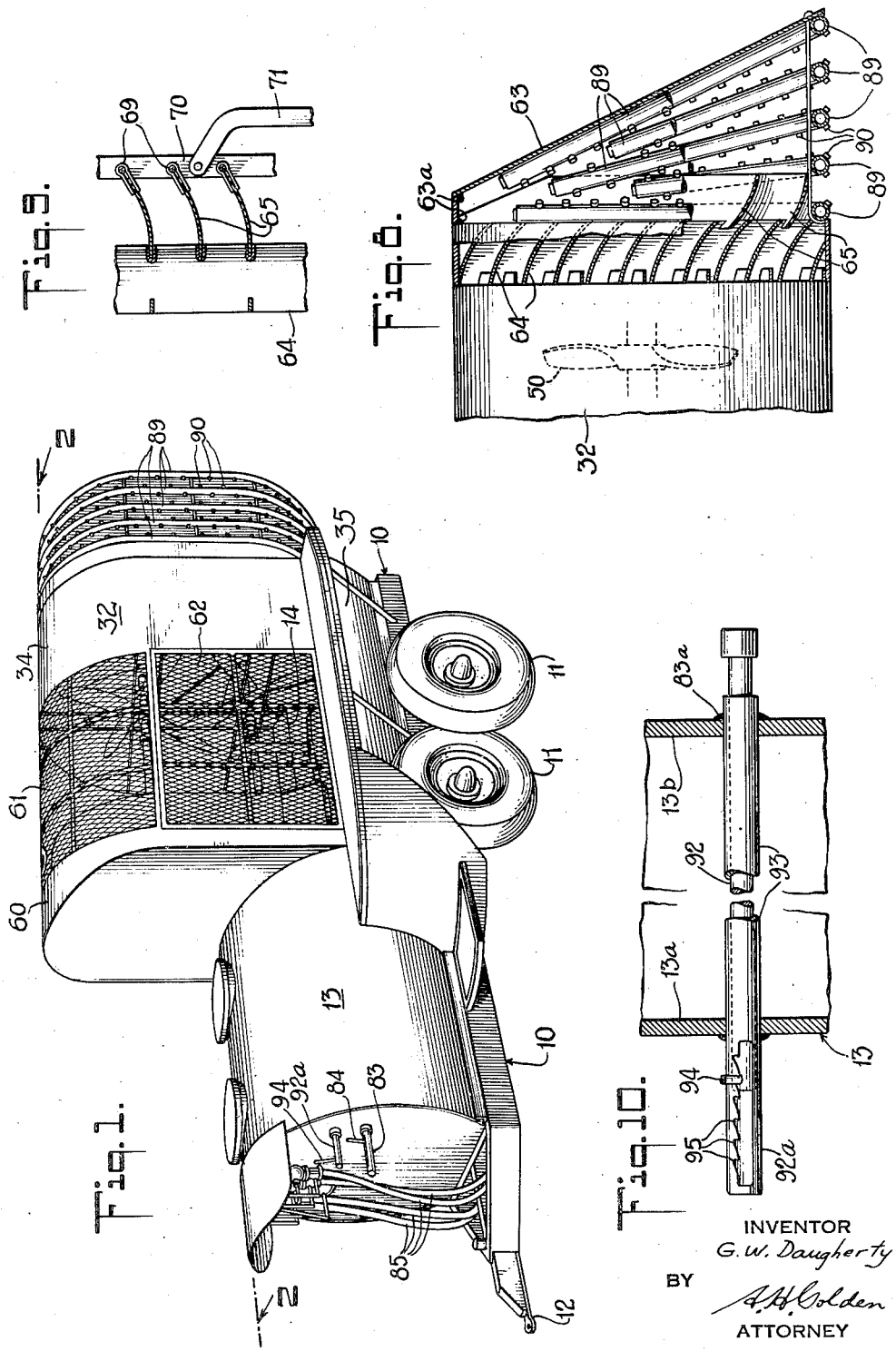

July 5, 1949.   G. W. DAUGHERTY   2,475,449
SPRAYING MACHINE
Filed July 21, 1944                    4 Sheets-Sheet 1

INVENTOR
G. W. Daugherty
BY
A. H. Golden
ATTORNEY

July 5, 1949.  G. W. DAUGHERTY  2,475,449
SPRAYING MACHINE
Filed July 21, 1944  4 Sheets-Sheet 2

INVENTOR
G. W. Daugherty
BY
A. H. Golden
ATTORNEY

July 5, 1949.  G. W. DAUGHERTY  2,475,449
SPRAYING MACHINE
Filed July 21, 1944 4 Sheets-Sheet 3
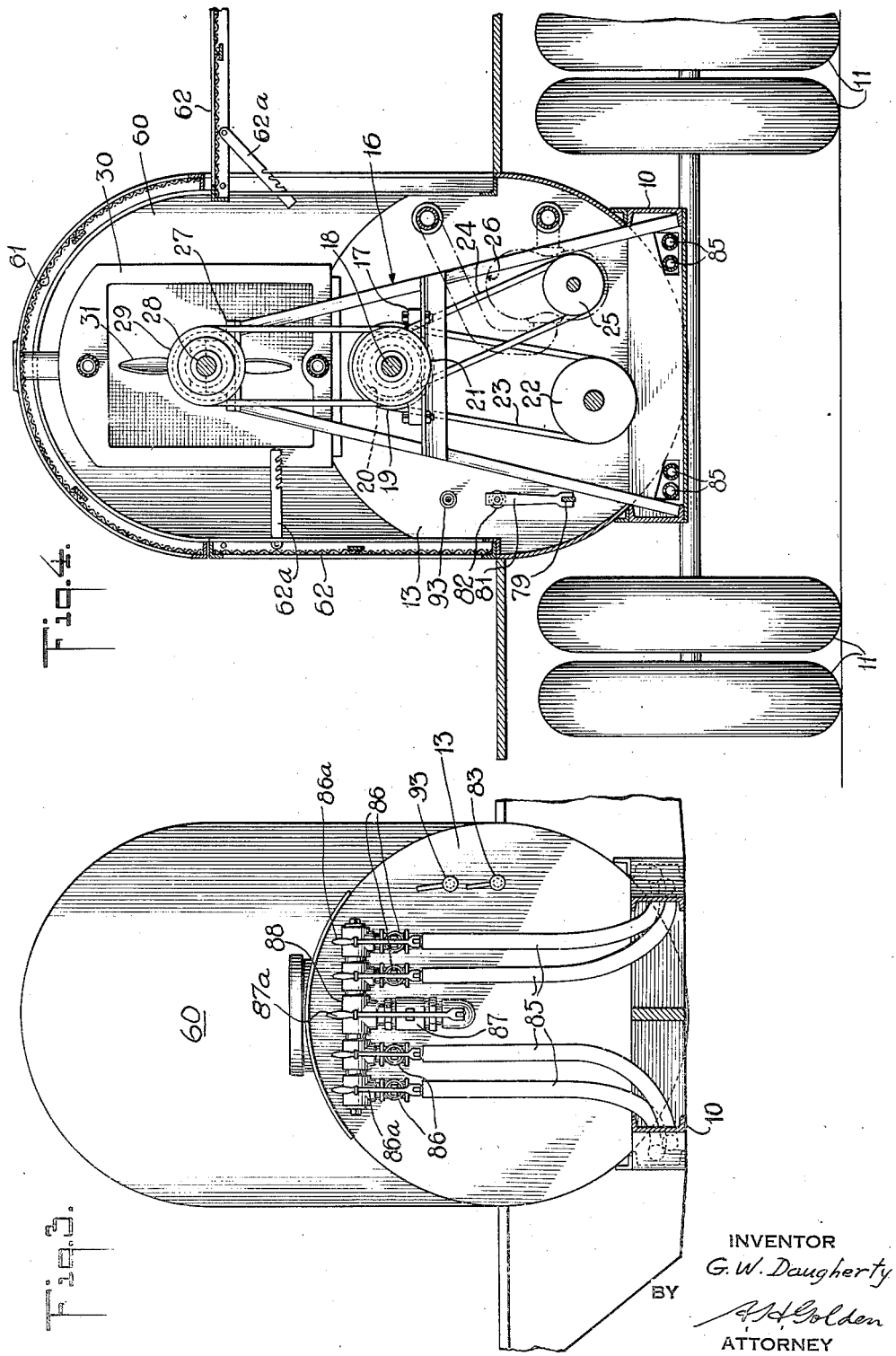
INVENTOR
G. W. Daugherty
BY
A. H. Golden
ATTORNEY July 5, 1949.  G. W. DAUGHERTY  2,475,449
SPRAYING MACHINE
Filed July 21, 1944  4 Sheets-Sheet 4
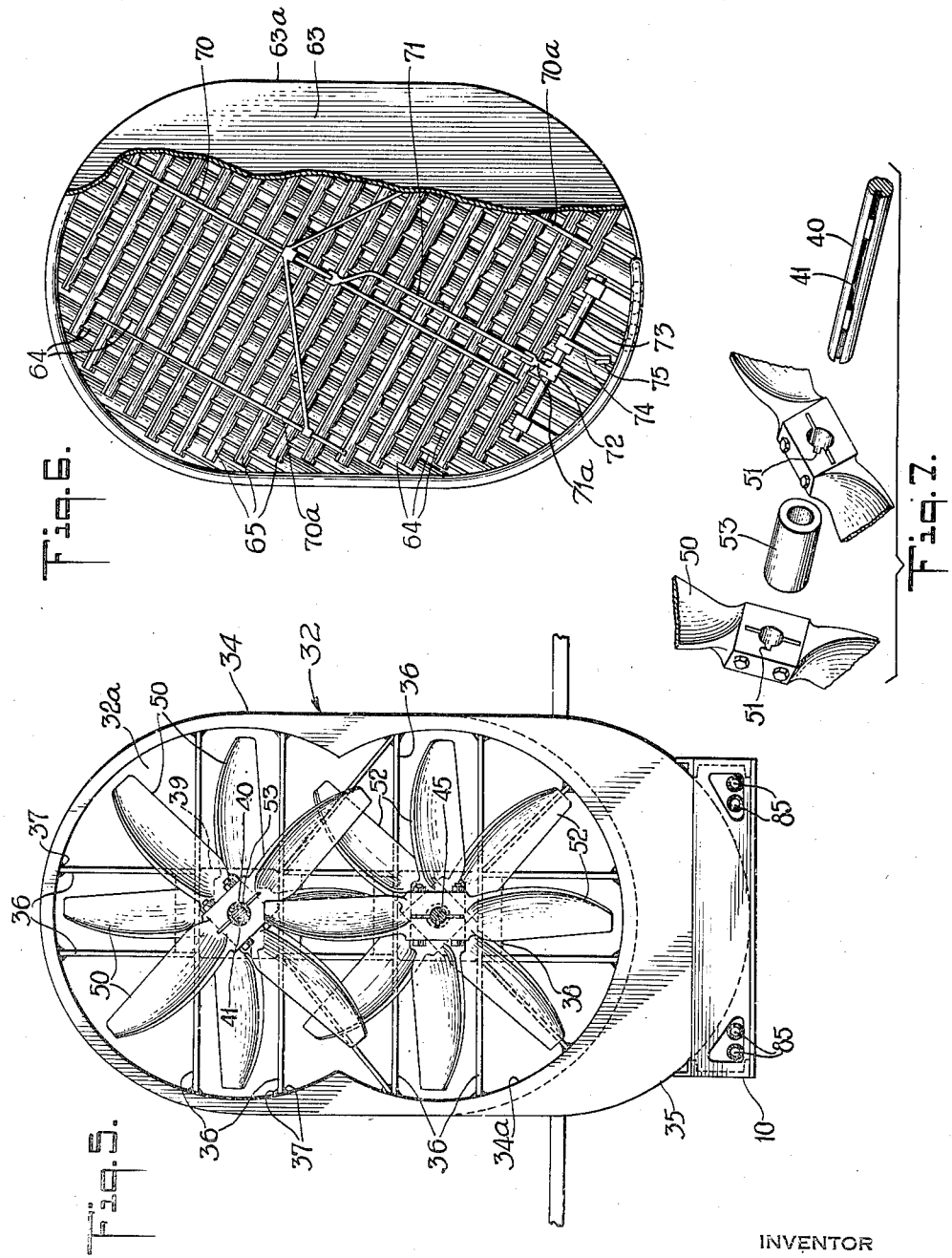
INVENTOR
G. W. Daugherty
BY
A. H. Golden
ATTORNEY Patented July 5, 1949

2,475,449

UNITED STATES PATENT OFFICE 2,475,449

SPRAYING MACHINE

George W. Daugherty, Orlando, Fla.

Application July 21, 1944, Serial No. 545,975

3 Claims. (Cl. 261—30)

This invention relates to a spraying machine of the type disclosed in my Patents Nos. 2,220,082 and 2,331,107 and in my application Serial No. 422,478, filed December 11, 1941, now Patent No. 2,358,318, dated September 19, 1944. In the said patents there is disclosed a machine that is adapted to be moved through an orchard or orange grove and to send forth a large volume of spraying material for thoroughly covering the foliage of the trees of the orchard or orange grove.

My earlier structures show a vehicle carrying a tank in which is contained spraying material, a motor, and a propeller rotated by the motor for developing an air blast. This air blast is preferably generated through a chamber that I prefer to call an air tunnel, and then is directed towards the trees by air guide means secured at that end of the tunnel through which the air blast leaves the tunnel. The air guide means may take various forms as shown in my patents and in the application, and they are subject to several different controls.

I have found that it is very important to obtain a uniform flow of the air blast out of the open end of the chamber or tunnel in order to effect a proper distribution of the spraying material, and effective coverage of the trees to be sprayed. My earlier structures embody means that are quite effective for obtaining this uniform flow. However, this invention contributes far better results than my earlier mechanisms, and the actual structure I have developed utilizing my invention herein to be set forth, is extremely effective and yields extraordinarily fine coverage of the foliage.

In view of what has been set forth it will be evident that the main object of my invention is to obtain a uniform flow of air through an open-ended chamber that I call an air tunnel, for the purpose of picking up spraying material to be directed with the air blast uniformly into the foliage of the trees of an orchard, orange grove or the like.

A further object of my invention is the facilitation of the control of the motor and air guide means so that a single operator may tow the machine of my invention and operate the controls thereof.

One feature of my invention whereby the objects thereof are obtained, resides in the utilization of at least a pair of propellers maintained for rotation about parallel axes and in overlapping relation for developing a flow of air through an open-ended chamber for cooperation with means for feeding spraying material into the air blast, and for direction thereafter by suitable air directing means toward the trees to be sprayed. A more particular feature of my invention resides in the arrangement of the said propellers so that the tips of the blades thereof will extend into juxtaposed relation to the shafts upon which the propellers are mounted for rotation.

A still further feature of my invention resides in the utilization of a plurality of angularly spaced propellers for rotation on each of two parallel axes whereby to develop an air blast for utilization as set forth.

A feature of my invention resides also in the forming of a passage through the tank containing the spraying material used in my machine, this passage housing control mechanism for the machine, and making accessible the control mechanism at the forward end of the tank and the machine.

While the several features thus outlined are the more important features of my invention, other features will be described in the specification that follows and will be set forth in the claims appended hereto. The outline of the invention has been presented in order that a proper appreciation of the relation of the invention to the prior art may be had, and it is suggested that a reading of my earlier patents and patent application may be of further help in that direction. Those skilled in the art will understand that while the form of my invention herein to be illustrated and described is preferred by me, it is naturally possible to develop other mechanical structures utilizing my invention, and that my invention should therefore not be limited to the specific form I shall describe.

Figure 2:
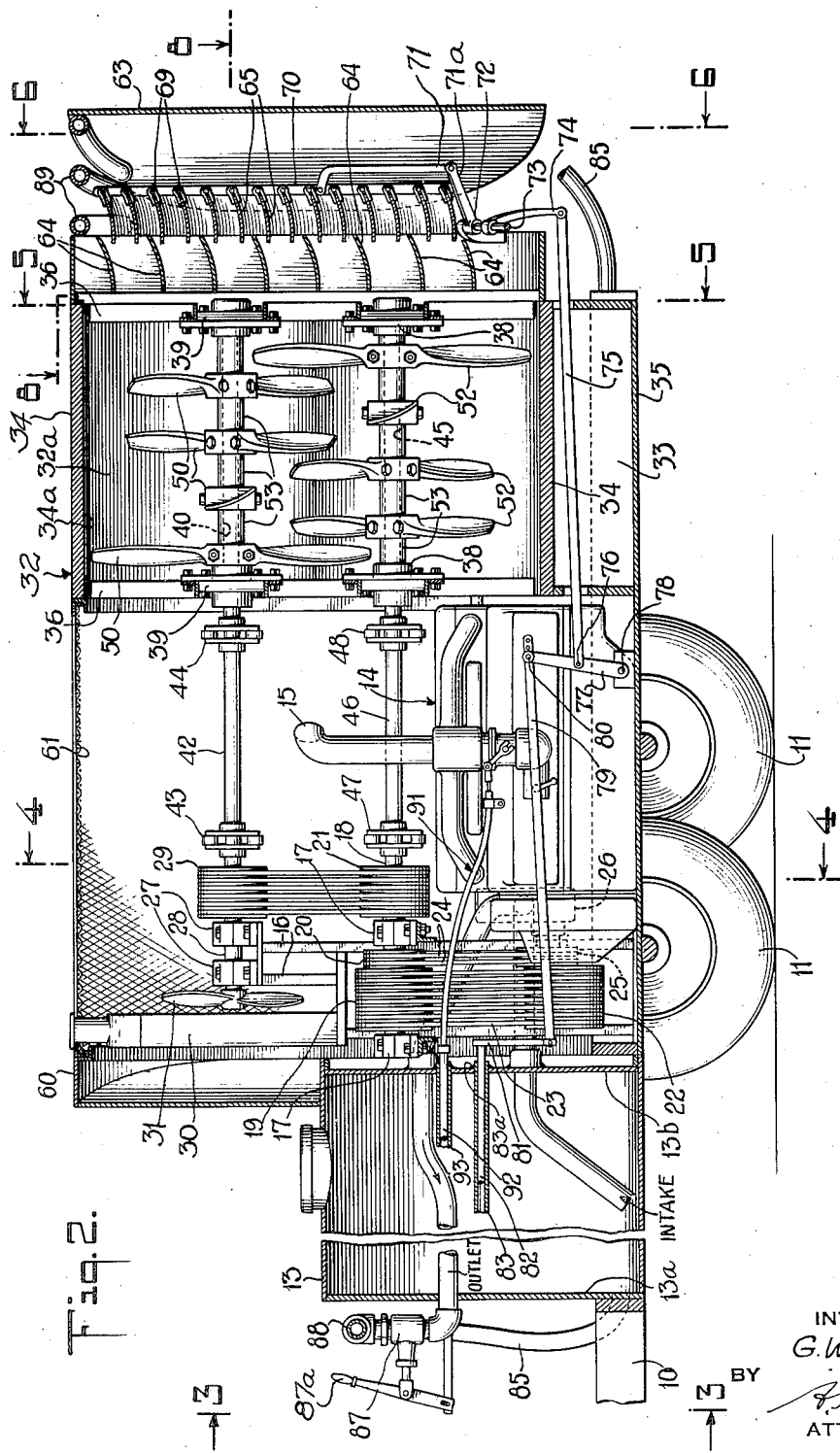

Referring now to the drawings, Fig. 1 is a perspective view of a machine embodying my invention. Fig. 2 is a vertical section taken along lines 2—2 of Fig. 1. Fig. 3 is a view looking at the front end of the machine in the direction of arrows 3—3 of Fig. 2. Fig. 4 is a section taken along lines 4—4 of Fig. 2. Fig. 5 is a section taken along lines 5—5 of Fig. 2. Fig. 6 is a partial section taken along lines 6—6 of Fig. 2. Fig. 7 is an exploded view showing parts of a pair of propellers, the shaft on which they are keyed, and a sleeve therebetween. Fig. 8 is a horizontal section taken along lines 8—8 of Fig. 2. Fig. 9 is a view illustrating the adjustment of certain parts of my invention. Fig. 10 is a section through the tank illustrating the throttle control.

Referring now more particularly to the drawings, the machine embodying my invention utilizes a chassis 10 supported by four wheels 11, and having a tow hitch at 12 whereby it may be connected to a tractor or some similar vehicle to be towed through an orchard or orange grove to be sprayed. Supported on chassis 10 is a tank 13 adapted to contain the spraying material. An internal combustion engine 14 is also mounted on the chassis 10, and has its exhaust extending upwardly at 15. The engine 14 is utilized for driving a pump whereby to effect a flow of the spraying material to the spraying nozzles hereinafter set forth, and also to drive the propellers of my machine as I shall hereinafter indicate more fully.

Referring now more particularly to Figs. 2 and 4, there is secured to the chassis 10 between tank 13 and motor 14, an A-frame 16 formed of structural iron parts. The A-frame 16 carries a pair of suitable spaced bearings 17 that support a shaft 18, the shaft 18 having mounted thereon a relatively large pulley 19, a small pulley 20, and a third pulley 21. The pulleys are preferably grooved as indicated for multiple belts, and cooperating with the pulley 19 is a large drive pulley 22 driven directly by the motor 14. Through the series of belts 23, the pulley 19 is driven by the motor pulley 22 as is quite readily seen. Because the pulley 19 is keyed to the shaft 18, the shaft 18 will be rotated and will effect rotation of pulleys 20 and 21 also keyed to the said shaft. The belts 24 in the grooves of pulley 20 extend downwardly to a pulley 25 that is keyed to the shaft of a pump 26 for driving the said pump. Further reference will later be made to pump 26.

The A frame 16 has mounted at its upper end on spaced bearings 27, a shaft 28 to which is keyed a pulley 29 in vertical alignment with the pulley 21 of shaft 18. Through the particular arrangement of belts extending between pulleys 21 and 29, and because pulley 29 is the same as pulley 21 in diameter, the shaft 28 will be driven at the same speed as the shaft 18.

A radiator 30 is supported between the A frame and a forward structural member 60, and is suitably connected with the water jackets of the engine 14 so as to serve to cool the engine. A fan 31 is keyed to the shaft 28 and serves to cool the radiator in the usual standard manner as shaft 28 is rotated by the engine 14 through the operation of the several means set forth.

Referring now to Fig. 5, as well as Figs. 1 and 2, the chassis 10 is shown supporting a large structure 32 in which is formed a chamber 32a, the cross sectional shape of which is substantially that of a figure 8 as best seen from Fig. 5. The surface of structure 32 outlining the figure 8 chamber 32a, is designated by reference numeral 34a, while the outer surface of structure 32 is designated by reference numeral 34. A compartment 33 is formed at the bottom of the structure 32 as best seen in Figs. 2 and 5 and is separated from chamber 32a by a part of surface 34. The outer surface of compartment 33 is defined by the sheet metal surface 35 streamlined into a part of surface 34. In accordance with the practice I have established in my patents and earlier application, the figure 8 chamber 32a outlined by the surface 34a is termed by me an air tunnel, and it is through this air tunnel that the air blast is generated for guidance by the air directing means, and for picking up the material to be sprayed.

At the forward and rear ends of the chamber 32 there are mounted a series of vertical and horizontal cross bars 36 suitably welded at 37 relatively to the chamber 32. These bars 36 carry a pair of spaced lower bearings 38 and a pair of spaced upper bearings 39 as best illustrated in Figs. 2 and 5. Mounted on the upper bearings 39 is a shaft 40 formed with a keyway 41 for cooperation with a series of propellers as will hereinafter be set forth. The shaft 40 is driven by shaft 28 through a coupling shaft 42. The coupling shaft 42 is connected to the shaft 28 by a flexible coupling 43 and is connected to the shaft 40 by a flexible coupling 44.

In the machine illustrated by me I prefer to use a series of four propellers on the shaft 40 and a series of four propellers on a similar lower shaft 45. This lower shaft 45 is the same in construction as shaft 40, and is supported in the lower pair of bearings 38 parallel to upper shaft 40. Shaft 45 is connected to the shaft 18 by an intermediate shaft 46 and flexible couplings 47, 48. It is of course now readily seen that the two shafts 40 and 45 will rotate at exactly the same speed through pulleys 28 and 29, and that they may be set into any angular relationship that is desired for rotation at that speed. It is also readily seen that slippage in the belting will not seriously affect the operation of the shafts. Moreover, because of the offset relationship of the several propellers to be hereinafter described, it is not necessary that the shafts 40, 45 be maintained in any particular angular relationship, thereby making it possible to utilize the belt drive as set forth. This feature in itself is of considerable importance.

As indicated, the upper shaft 40 carries four propellers designated each by reference numeral 50. Each propeller 50 is formed with a keyway 51 as best seen in Fig. 7, and these keyways 51 are so positioned in the several propellers that when the propellers are keyed to the shaft 40 through shaft keyway 41, the blades of the propellers are spaced 45° from one another as shown in Fig. 5. Those skilled in the art will appreciate that for the purpose of manufacturing my machine, this feature is extremely important. Thus, the shaft 40 is formed with but one keyway and by manufacturing the propellers in matched sets, they are readily applied to the shaft with their blades at the 45° angular relationship set forth.

The lower shaft 45 carries a series of propellers 52 that are formed for cooperation with said shaft just as propellers 50 are formed for coaction with shaft 40. For preventing endwise movement of the several propellers on the shafts 40 and 45, I locate between the hubs of the propellers, sleeves 53 best shown in Fig. 7. These sleeves 53 maintain the propellers on the shafts in the offset relationship shown in Fig. 2 so that even should one of the propellers become loose on its shaft, as due to the destruction of its key or otherwise, it will still not move into the path of the propellers relatively to which it is offset. As earlier indicated, this makes it possible to use belt driven shafts with variable angular relationship. It is of course well to note also that sleeves 53 not only separate the propellers from one another but also maintain the end propellers in suitable relation to the bearings 38, 39 on which the shafts 40 and 45 are supported.

It will be further noted that the tips of the propellers 50 extend into close relation to the shaft 45 about which the propellers 52 are mounted, and that likewise, the tips of the propellers 52 extend into close relation to the shaft 40. Because of this relationship of the propellers, a very smooth and even blast of air is generated within the air tunnel of chamber 32. Whereas in my prior structures I required baffles of a complex nature for obtaining a smooth and even flow of air blast, the simple arrangement of the propellers I have herein set forth yields much more effective and desirable results, making it possible to generate a very extensive blast of air uniformly through an air tunnel for distributing spraying material in accordance with the direction contributed by the air guides to be set forth presently.

The structure 32 is suitably connected by a series of reinforcing members to the forward frame member 60, and wire grating 61 is applied over said reinforcing members to shield the apparatus from the foliage of the trees of the orchard or orange grove. As shown in Fig. 4, doors 62 may be provided and held open by ratchet bars 62a when it is desired to service the machinery. It may be well at this point to indicate that the fabrication of this machine in accordance with the teachings of my invention may take various forms and that my invention may be utilized readily in structures fabricated in a manner different from that herein described.

At the extreme rear of my machine there are mounted the air guides which preferably take the form taught in my Patent No. 2,358,318. Thus, secured to the end of the tunnel is a plate 63 that serves to prevent the movement of the air blast except to one side of the machine as is best seen in Figs. 2, 6 and 8. In my patent supra, the end plate is somewhat different and forms an opening that is angularly to one side and tapers upwardly. The end plate 63 of the present machine is angular only to one side and does not taper upwardly, being preferably welded along the line 63a to the structure 32.

Also, in accordance with the teachings of the invention set forth in my earlier patent supra, there is secured across the end of the tunnel 32a a series of what I term deflectors 64 that are positioned for deflecting the air angularly and upwardly to one side of the machine. Cooperating with these deflectors 64 are a series of elevator vanes 65 that are positioned at right angles to the deflectors 64 and are adapted to be curved by suitable adjusting means in order to assist in the directing of the air blast. These adjusting means may take various forms, as set forth in my earlier application, and will be briefly outlined here because the operating mechanism therefor is part of my invention. Thus, as shown in Figs. 6 and 9 each of the elevator vanes 65 extends across the open end of the air tunnel beyond the deflectors 64, and is secured at its outer edge at 69 to a central strut 70 or side struts 70a. The struts 70, 70a are in turn actuated by a lever 71 pivoted to a lever 71a that is keyed at 72 to a shaft 73. The shaft 73 has keyed thereto a lever 74 that is pivoted to a rod 75 extending through compartment 33 under chamber 32a.

The rod 75 is pivoted at 76 to a lever 77, the lever 77 being pivoted at 78 on chassis 10. A rod 79 is pivoted at 80 to the lever 77 and extends forwardly to a vertical strut 81 suitably secured to a horizontal rod 82. This horizontal rod 82 is housed in a passage formed in the tank 13 by a tube 83. Thus, the tube 82 is welded at 83a to the forward and rear plates 13a, 13b forming the tank 13, and thereby forms a passage through the tank for the rod 82, this passage being of course sealed from the tank as is apparent. The rod 82 may have a vertical extension 84 whereby it is readily moved in the tube 83 for actuating the leverage system just described, and which is connected to the struts 70, 70a. It is now readily seen that by movement of the rod 82 the degree of flexing of the horizontal vanes 65 is controlled. The forming of the passage through the tank 13 for the operation of the rod 82 is considered by me of great importance since it makes possible the manipulation of the vanes 65 from the front end of the machine. Thus, the operator on the tractor pulling the chassis 10 may readily actuate the extension 84 of rod 82 while the machine is in motion.

The functioning of the air guide means at the end of the tunnel is per se not the invention of this application and for a clear and full understanding of the operation of the vanes and deflectors, it is reiterated that reference should be had to my earlier Patent No. 2,358,318. Insofar as this application is concerned, any type of deflector mechanism may be used, since the mounting of the operating rod 82 for the deflector mechanism in the tank passage is the combination claimed herein as my contribution to the art.

As was set forth earlier, the motor 14 not only rotates the several propellers but also actuates the pump 26. Thus the pump effects the flow of the spraying material from the tank 13 through a pipe marked "intake" and then through a pipe marked "outlet" to a large manifold 88. The spraying material then flows from manifold 88 through a series of flexible hose 85 best shown in Fig. 3. The hose 85 extends from a series of valves 86 connected to manifold 88, each of the valves being actuated by a lever 86a. Through the operation of any one of the four levers 86a, any one of the four valves 86 may be closed to stop the flow of spraying material through its particular hose 85. A master valve 87 actuated by a lever 87a may be actuated for stopping the flow through the manifold 88 and therefore all of the valves 86 and the four hose 85.

The several hose 85 extend through the lower part of the machine and the compartment 33 to a series of pipes 89 arranged vertically and horizontally at the rear end of the machine and forwardly of the end plate 63 in the space between the end plate and the chamber 32 through which the air blast is moved. The pipes 89 are formed with nozzles 90 through which the spraying material issues in spray form to be picked up by the air blast and moved in the direction imparted to the air blast by the vanes and deflectors in accordance with the teachings of my prior application. It is evident that through the shutting off of the flow of spraying material through any one of the hose 85, the distribution of spraying material through the pipes 89 and nozzles 90 is effectively controlled. It is of course fully appreciated that this control of the flow of spraying material is available to the operator as he rides on the tractor, all as has already been set forth with regard to the control of the vanes 65.

The speed of rotation of the propellers is of course controlled by the speed of rotation of the engine 14. The throttle of the engine 14 is best controlled by a Bowden wire in a Bowden tube 91, and this Bowden wire is actuated by a rod 92 extending through a tube 93 assembled to the tank 13 in exactly the same manner as is the tube 83. The end of the tube 93 may extend outwardly of the tank 13 as best illustrated in Fig. 10, where the outwardly extending portion is designated by reference numeral 92a, and is shown ratcheted at 95 for cooperation with a pin 94 forming an integral part of the rod 92. The purpose of the ratcheted portion 95 is to lock the pin 94 and rod 92 in any adjusted position, so as to maintain the trottle of the engine 14 in any speed position that may be desired. Naturally, the throttle is therefore made available for control at the front end of the machine in the same manner as are the spray material controls and the air blast direction controls.

I believe that the operation and construction of my invention will now be appreciated by those skilled in the art, and that the particular contribution of this application will be well understood without further review thereof.

I now claim:

1. In a machine of the class described, a tank at one end thereof, a propeller adapted to generate an air blast, an air guide chamber formed for the movement therethrough of said air blast secured at the other end of said machine, means for pumping spraying material from said tank to said air blast to be formed by said air blast into a fine fog of material, movable air guide means secured at the exhaust end of said air guide chamber for directing the air blast issuing therefrom, a tube secured in said tank to form an open passageway therethrough, and means for moving said air guide means extending from said air guide means to said tank and through said tube to the other end of said tank for manual manipulation.

2. In a machine of the class described, a tank at one end thereof, a propeller adapted to generate an air blast, an air guide chamber for the movement therethrough of said air blast and secured at the other end of said machine, means for pumping spraying material from said tank to said air blast to be formed by said air blast into a fine fog of material, movable air guide means secured at the exhaust end of said chamber for directing the air blast issuing from said tunnel, a means secured in said tank to form an open passageway therethrough, and means for moving said air guide means extending from said air guide means to said tank and through said passageway to the other end of said tank for manual manipulation.

3. In a machine of the class described, a tank at one end thereof, a propeller adapted to generate an air blast, an air guide chamber for the movement therethrough of the air blast and secured at the other end of said machine, means for pumping spraying material from said tank to said air blast to be formed by said air blast into a fine fog of material, movable air guide means secured at the exhaust end of said air guide chamber for directing the air blast issuing from said tunnel, a tube secured in said tank and welded at its ends to the ends of the tank to form an open passageway through said tank, and means for moving said air guide means extending from said air guide means to said tank and through said tube to the other end of said tank for manual manipulation.

GEORGE W. DAUGHERTY.

REFERENCES CITED

The following references are of record in the file of this patent:

UNITED STATES PATENTS

| Number | Name | Date |
| --- | --- | --- |
| 1,375,734 | Savy | Apr. 26, 1921 |
| 1,381,436 | Savy | June 14, 1921 |
| 1,551,877 | Henning | Sept. 1, 1925 |
| 1,686,413 | Laronde | Oct. 2, 1928 |
| 1,691,846 | Halvorson | Nov. 13, 1928 |
| 1,913,590 | Flacek | June 13, 1933 |
| 2,111,178 | Crumback | Mar. 15, 1938 |
| 2,197,290 | Baker et al. | Apr. 16, 1940 |
| 2,238,120 | Launder | Apr. 15, 1941 |
| 2,331,107 | Daugherty | Oct. 5, 1943 |
| 2,358,318 | Daugherty | Sept. 19, 1944 |